United States Patent
Sykes, Sr.

(10) Patent No.: US 6,958,681 B1
(45) Date of Patent: Oct. 25, 2005

(54) ELECTRICAL DEVICE FOR SENSING A SURFACE

(76) Inventor: William B. Sykes, Sr., 3313 Windrift Dr., Greensboro, NC (US) 27410

( * ) Notice: Subject to any disclaimer, the term of this patent is extended or adjusted under 35 U.S.C. 154(b) by 92 days.

(21) Appl. No.: 10/725,211

(22) Filed: Dec. 1, 2003

(51) Int. Cl.$^7$ ................................. H04B 3/36
(52) U.S. Cl. ................ 340/407.1; 340/666; 340/573.1; 36/136; 73/172
(58) Field of Search .......................... 340/407.1, 666, 340/272, 573.1, 685; 36/136, 137; 73/862, 73/625, 172

(56) References Cited

U.S. PATENT DOCUMENTS

| | | | |
|---|---|---|---|
| 3,070,907 A | * | 1/1963 | Rocco .......................... 36/8.3 |
| 3,974,491 A | * | 8/1976 | Sipe .......................... 340/573.1 |
| 5,298,884 A | * | 3/1994 | Gilmore et al. .......... 340/573.4 |
| 6,031,463 A | * | 2/2000 | Bechmann .................. 340/666 |
| 6,035,035 A | * | 3/2000 | Firooz ...................... 379/433.1 |
| 6,122,846 A | * | 9/2000 | Gray et al. .................... 36/136 |

OTHER PUBLICATIONS

Book complied by inventor; 126 pages; references from websites; Classification definitions from, Electricity: Electrical Systems and Devices; General Information Concerning Patents; No patents included; relevent pages stapled.
American Science & Surplus catalog, Oct. 2003, vol. 188, p. 55 showing small vibrator.

\* cited by examiner

Primary Examiner—Anh V. La

(57) ABSTRACT

The invention herein pertains to sensing a ground surface with the foot while walking. Persons having foot and leg nerve damage are often unable to walk without assistance because they can not recognize the ground surface as with normal foot sensory perception. The electrical device herein includes a vibrator which is worn against the skin of the leg and signals the wearer immediately as the foot touches the ground surface. The preferred embodiment of the invention utilizes a shoe having a switch located proximate the heel with the vibrator positioned in a strap surrounding the wearer's knee.

13 Claims, 2 Drawing Sheets

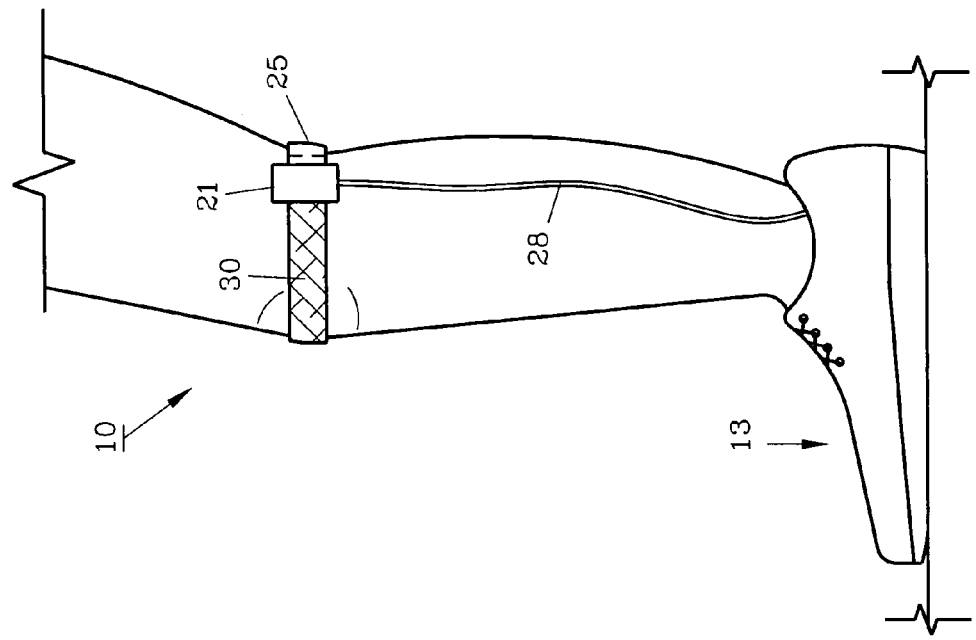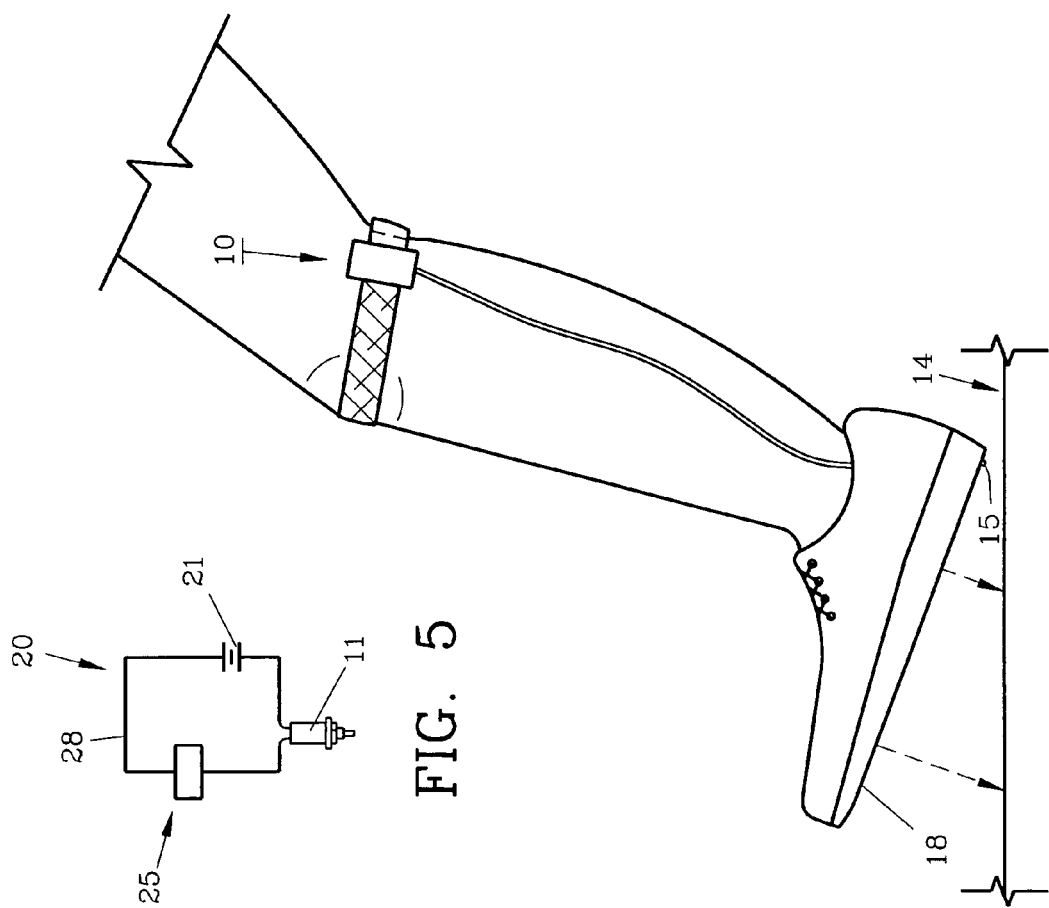

ELECTRICAL DEVICE FOR SENSING A SURFACE

FIELD OF THE INVENTION

The invention herein pertains to an electrical sensing device and particularly pertains to a sensing device which can be used by persons suffering from nerve damage to their feet and lower legs to assist them while walking.

DESCRIPTION OF THE PRIOR ART AND OBJECTIVES OF THE INVENTION

In recent years patients with nerve deterioration or damage in their feet and lower limbs have sought various treatments and devices to assist them in walking. Crutches, canes, walkers, wheelchairs and the like have all been used with varying degrees of success. However, many patients suffer only slight nerve damage in their feet or lower legs and may not want or need conventional walking assistance devices. However, only limited choices are available and such patients require assistance in some form.

In view of the current inconvenience and disadvantages of various walking aids and devices currently available, the present invention was conceived and one of its objectives is to provide an electrical device for sensing a surface which can be easily placed on the foot and leg of the wearer, yet which is unobtrusive compared to standard walking aids.

It is also an objective of the present invention to provide an electrical device for sensing a surface which will immediately inform the wearer as the foot contacts the ground.

It is a further objective of the present invention to provide an electrical device for sensing a surface which will allow a patient with nerve damage to the foot to walk with ease and confidence.

It is still a further objective of the present invention to provide an electrical device for sensing a surface which includes a battery operated power supply, a switch and a vibrator.

It is yet a further objective of the present invention to provide an electrical device for sensing a surface which includes a strap for maintaining a vibrator at a desired location along the leg.

It is still a further objective of the present invention to provide an electrical device for sensing a surface by the foot which includes a modified shoe having a normally-open switch mounted in the heel.

Various other objectives and advantages of the present invention will become apparent to those skilled in the art as a more detailed description is set forth below.

SUMMARY OF THE INVENTION

The aforesaid and other objectives are realized by providing an electrical device for sensing the ground or other surfaces while walking. The device includes a shoe which contains a normally-open switch mounted in the heel. The switch is positioned in an opening in the bottom of the shoe heel and is affixed therein by the use of a resilient polymeric adhesive such as a conventional rubber adhesive as is commonly available. A conductor is attached at one end to the switch and the other end of the conductor is attached to a power supply and vibrator mounted on an adjustable leg strap, such as a strap formed from hook and loop fastener material. The conductor is of a sufficient length to allow the strap to be affixed proximate the knee of the wearer. Thus, as the wearer places his shoe heel against the ground surface, the switch is closed allowing current from the battery to flow through the switch to the vibrator. The vibrator provides a signal to the wearer through the leg whereby the wearer recognizes the foot is in contact with the ground. Thus, with nerve damage to the foot a wearer can walk in a normal manner while receiving the vibrational signals through the leg.

BRIEF DESCRIPTION OF THE DRAWINGS

FIG. 3 shows the leg as in FIG. 1 with the shoe positioned slightly before making ground contact;

FIG. 4 depicts the shoe as seen in FIG. 3 immediately after ground contact is made; and FIG. 5 features a schematic representation in reduced form of the electrical circuitry of the sensing device.

DETAILED DESCRIPTION OF THE PREFERRED EMBODIMENT AND OPERATION OF THE INVENTION

Figure 2:
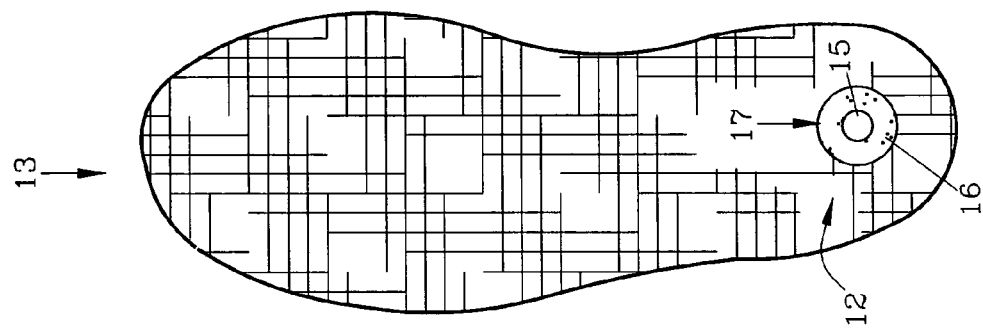
FIG. 2 demonstrates an enlarged bottom view of the shoe as seen in FIG. 1.
Figure 1:
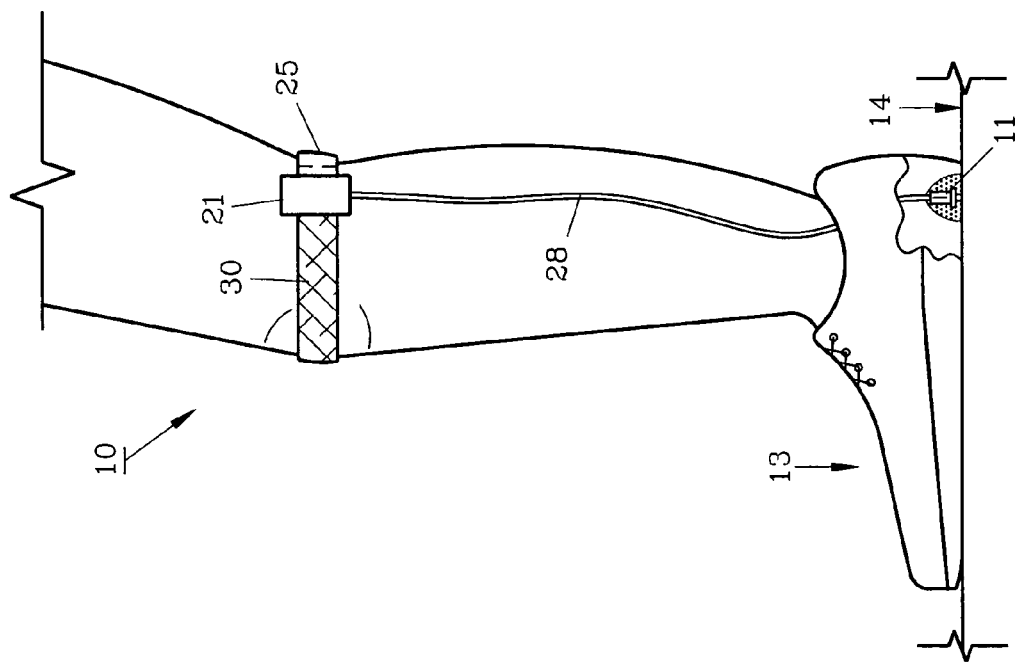
FIG. 1 illustrates a schematic view of a leg with the electrical sensing device of the invention contacting a ground surface.

For a better understanding of the invention and its operation, turning now to the drawings, FIG. 1 shows in schematic representation preferred sensing device 10 which includes a push button switch 11 mounted in heel bottom 12 of preferred sport shoe 13, seen also in FIG. 2. While shoe 13 is a typical sports shoe, various other types of shoes could be used as desired. Switch 11 also shown in FIG. 5 is preferably a standard normally-open type switch having resiliently mounted push button 15, as purchased for example from a Radio Shack retail store as located throughout the country.

In FIG. 2, switch 11 is mounted in a standard resilient, flexible adhesive 16 in heel opening 17. Adhesive 16 will not break or crack due to its flexibility as push button 15 is depressed and returns and also seals heel bottom 12 from water penetration. In FIG. 3 push button 15 extends slightly from heel bottom 12 of shoe 13 and as heel bottom 12 makes contact with ground surface 14 in FIG. 4, push button 15 is depressed thereby closing switch 11, allowing current to flow through electrical circuitry 20 as shown in FIG. 5. Current passes from standard preferred nine volt (9V) battery 21 through switch 11 to vibrator 25. Vibrator 25 is a typical cell phone vibrator preferably model No. 1E110, as sold by American Science & Surplus, Inc. of Skokie, Ill., which vibrates to signal the wearer that ground contact has been made. The terms "ground" and "ground surface" as used herein refer to any surface such as sidewalks, floors, walkways, streets and other surfaces encountered during walking.

Vibrator 25 is positioned within leg strap 30 which consists of hook and loop fastener material with electrical conductor 28 attached thereto. Electrical conductor 28 is connected to battery 21 and vibrator 25. Thus when switch 11 is depressed as shown in FIGS. 1 and 4, vibrator 25 is activated and instantly signals the wearer that heel 12 has contacted ground surface 14. By sensing ground surface 14 the wearer can then walk with confidence, even with loss of normal foot nerve stimulation.

While the drawings herein only depict one shoe 13 being worn, each shoe of the wearer could be likewise configured with sensing device 10 if nerve damage has occurred in both feet.

The illustrations and examples provided herein are for explanatory purposes and are not intended to limit the scope of the appended claims.

I claim:

1. A device mounted on the leg for sensing the wearer's foot contact with a surface by the wearer, comprising: an electrical circuitry, a signal generator, a switch, a power supply, said power supply, switch and signal generator connected to said electrical circuitry, a strap, said strap for attachment proximate the wearer's knee, said strap attached to said signal generator whereby closing said switch by contacting the surface with the foot will activate said signal generator to send a signal to the wearer's knee.

2. The device of claim 1 wherein said power supply comprises a battery.

3. The device of claim 1 wherein said switch comprises a push button switch of the normally-open type.

4. The device of claim 1 wherein said signal generator is a vibrator.

5. The device of claim 2 wherein said battery is a nine volt (9V) battery.

6. The device of claim 1 wherein said electrical circuitry comprises a metal conductor, said conductor for delivering electrical current from said power supply through said switch to said generator.

7. The device of claim 1 wherein said strap is a hook and loop fastener material.

8. The device of claim 1 further comprising a shoe, said switch mounted in said shoe.

9. The device of claim 8 wherein said switch comprises a push button, said shoe exposing said push button.

10. An electrical sensing device for wearing on the leg proximate the knee to signal the wearer at the knee when the foot strikes the ground surface comprising: an electrical conductor, a battery, a push button switch and vibrator, said battery, push button switch, and vibrator connected to said electrical conductor to form a circuit, a shoe, said switch contained within said shoe, a leg strap, said vibrator positioned on said leg strap, said leg strap attached to the wearer's leg at least at knee height whereby the wearer placing the shoe on the ground closes the switch to activate said vibrator and signal the wearer.

11. The device of claim 10 wherein said strap is a hook and loop fastener material.

12. The device of claim 10 wherein said shoe defines an opening in the heel to expose said switch.

13. The device of claim 10 wherein said battery is affixed to said leg strap.

* * * * *